United States Patent [19]

Yntema

[11] Patent Number: 4,960,044

[45] Date of Patent: Oct. 2, 1990

[54] APPARATUS FOR PREPARING A CURD MASS

[75] Inventor: Everardus G. M. Yntema, Bolsward, Netherlands

[73] Assignee: Stork Friesland B. V., Gorredijk, Netherlands

[21] Appl. No.: 432,561

[22] Filed: Nov. 7, 1989

[30] Foreign Application Priority Data

Nov. 8, 1988 [NL] Netherlands ............ 8802738

[51] Int. Cl.$^5$ .............................................. A01J 25/11
[52] U.S. Cl. .......................................... 99/458; 99/465
[58] Field of Search ....................... 99/452, 456–459,
99/495, 465, 503, 508; 100/110, 112, 125;
210/158, 159, 407, 498

[56] References Cited

U.S. PATENT DOCUMENTS

| | | | |
|---|---|---|---|
| 2,312,999 | 3/1943 | DeLangen | 210/407 |
| 3,326,383 | 6/1967 | Pranovi | 210/407 |
| 4,061,794 | 12/1977 | Charles | 99/458 |
| 4,123,356 | 10/1978 | Sugimoto et al. | 210/159 |
| 4,157,680 | 6/1979 | Charles | 99/458 |
| 4,237,781 | 12/1980 | Charles | 99/459 |
| 4,332,831 | 6/1982 | Rust | 426/582 |
| 4,418,616 | 12/1983 | Streeter et al. | 99/465 |
| 4,539,902 | 9/1985 | Brockwell et al. | 99/456 |
| 4,795,570 | 1/1989 | Young | 210/407 |

FOREIGN PATENT DOCUMENTS 8807322 10/1988 World Int. Prop. O. ............ 99/459

Primary Examiner—Timothy F. Simone
Attorney, Agent, or Firm—Nilles & Nilles

[57] ABSTRACT

An apparatus for preparing a curd mass by draining a mixture of whey and curds in an upright column consists of a permeable sleeve or circular or rectangular cross-section, one or more sleeves being surrounded, with some clearance, by a tube monted on a worktable. The apparatus further comprises means at one end of the tube, above or under the worktable, for feeding the mixture of whey and curds and means at the other end of the sleeve, under or above the worktable, for receiving and discharging a drained and extruded curd mass. The free space between the sleeve or sleeves and the tube is subdivided into various compartments, lying one above the other, with the aid of sealing dividers. Each compartment is provided with inlet and outlet connections for whey or cleaning liquid. The sleeve or sleeves disposed inside the same tube forms or form a fixed assembly with the partitions and with said tube. The assembly thus formed is detachably fastened on the worktable, while the connections of the compartments are also provided with detachable couplings.

5 Claims, 1 Drawing Sheet

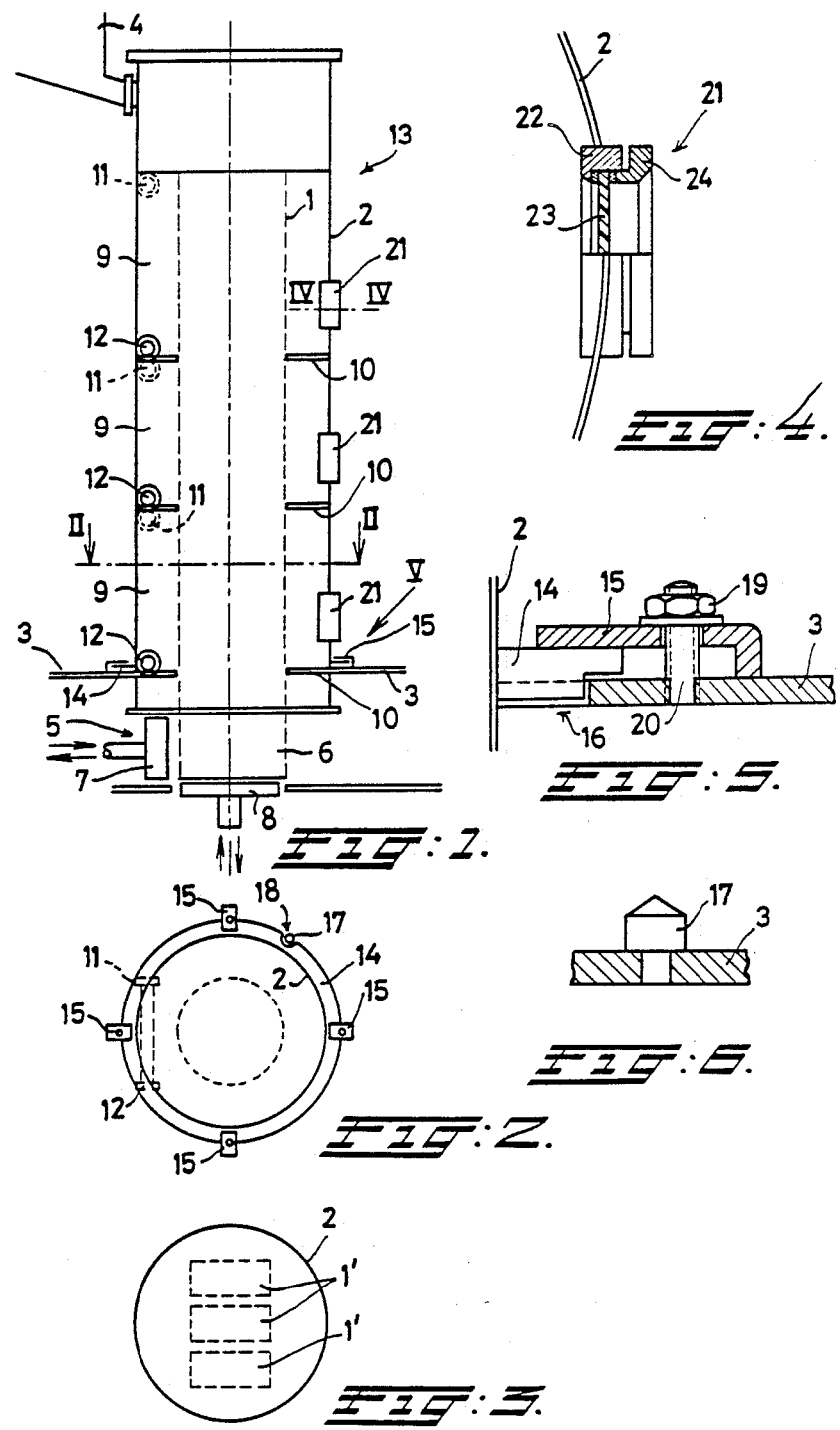

APPARATUS FOR PREPARING A CURD MASS

BACKGROUND OF THE INVENTION

1. Field of the Invention

The invention relates to an apparatus for preparing a curd mass by draining a mixture of whey and curds in an upright column consisting of a permeable sleeve of circular or rectangular cross-section, one or more sleeves being surrounded, with some clearance, by a tube mounted on a worktable, and further comprising means at one end of the sleeve, above or under the worktable, for feeding the mixture of whey and curds, and means at the other end of the sleeve, under or above the worktable, for receiving and discharging a drained and extruded curd mass, the free space between the sleeve or sleeves and the tube being subdivided into various compartments, lying one above the other, with the aid of sealing dividers, while each compartment is provided with inlet and outlet connections for whey or cleaning liquid.

2. Description of the Related Art

Various constructions of an apparatus of this kind are known, and it is possible to distinguish a system having an inlet for the curds and whey mixture at the top end of the permeable sleeve, and a system in which this inlet is situated at the bottom end of the sleeve. In each of these known arrangements the sleeves must from time to time be removed from the machine for inspection and cleaning purposes, or for replacement. Since each sleeve usually has a length of at least 2 meters, and sometimes even 3 to 3.5 meters, the height of the factory roof must be determined accordingly, since otherwise the removal of the sleeves would give rise to complications.

SUMMARY OF THE INVENTION

The invention seeks to provide a simplification in this respect, this being achieved in that the sleeve or sleeves disposed inside the same tube forms or form a fixed assembly with the dividers and with said tube, the assembly thus formed being detachably fastened on the worktable, while the connections of the compartments are also provided with detachable couplings.

As a result of these measures, a low roof can never be a hindrance to the detachment of the sleeves, since the entire assembly can be moved sideways and tilted over. An important incidental advantage is the fact that the ever present threat of bacterial infection in the seals between the dividers and the outer periphery of the sleeve is reduced because with a detached assembly it is easier to give careful attention to these sealing points.

These and other features of the novel apparatus thus proposed will be explained more fully with reference to the drawing, which shows some variants of this apparatus.

BRIEF DESCRIPTION OF THE DRAWINGS

FIG. 1 is a simplified side view of the apparatus.

FIG. 2 is a horizontal section on the line II—II in FIG. 1, showing a permeable sleeve of cylindrical shape.

FIG. 3 is a similar section to FIG. 2 in the case where the tube contains in its interior three sleeves of rectangular shape.

FIG. 4 is a horizontal section on the line IV—IV in FIG. 1, showing the window construction on a larger scale, partly in section and in elevation.

FIG. 5 shows on a considerably larger scale the detail V indicated in FIG. 1.

FIG. 6 shows on a larger scale the locating peg which is visible in the right-hand top half of FIG. 2.

BRIEF DESCRIPTION OF THE PREFERRED EMBODIMENTS

The apparatus shown in FIG. 1 is composed of a permeable sleeve 1, which is contained, with some clearance, in a tube 2 mounted on a worktable 3. The tube 2 includes a wall having an inside and an outside. At the top end of the sleeve 1 and the tube 2, feed means 4 are provided for feeding a mixture of curds and whey. At the bottom end of the sleeve 1, in a region underneath the worktable 3, discharge means 5 are provided for receiving and discharging a drained and extruded curd mass. As described in the co-pending U.S. patent application Ser. No. 431,579, the discharge means 5 consist of an auxiliary basket 6, a pusher member 7 and a plate 8. The free space between the sleeve 1 and the tube 2 is subdivided by sealing dividers 10 into several compartments 9, lying one above the other. Each compartment is sealed from the others by the sealing dividers 10. Each compartment 9 is provided with inlet and outlet connections 11, 12 for the admission (via connection 11) and discharge (via connection 12) of whey or cleaning liquid. The section in FIG. 2 shows that a single cylindrical sleeve 1 may be disposed inside the tube 2, while in FIG. 3 it can be seen that a plurality of sleeves 1', for example of rectangular shape, can be disposed inside the tube 2.

The tube 1 or the tubes 1' situated inside a single tube 2 form a fixed assembly 13 with the dividers 10 and with said tube. The assembly thus formed is detachably fastened on the worktable 3. For this purpose, each assembly 13 is provided, near a rim of the tube 2, with a flange 14. With the aid of a plurality of fastening means in the form of pressure members 15, also known as clamp plates, this flange can be fastened on the worktable 3 (see FIG. 5). The inlet and outlet connections 11, 12 of the compartments 9 are also provided with detachable couplings (not shown), for example, of the type customary for pipe couplings.

From FIGS. 1 and 5 it can be seen that the tube 2, which mainly lies above the worktable 3, also extends slightly underneath said table 3. For this purpose this table is provided with an opening 16, while the flange 14 has a downwardly directed thickened portion fitting into the opening 16. The correct position of the assembly 13, that is to say of the tube 2, on the worktable 3 is ensured by the presence on the worktable 3 of a locating peg 17, which can be seen in FIGS. 2 and 6 and which can be fitted into a recess 18 in the flange 14. FIG. 2 shows the provision of four clamp plates 15, which are clamped with the aid of a nut 19 cooperating with a threaded pin 20.

A window structure 21 removable from the outside is provided in the wall of the tube 2 in each compartment 9 (see FIG. 1). This structure is shown in greater detail in FIG. 4 and consists of a ring 22 which is provided in its interior with a glass plate 23 which is mounted in a conventional manner between two seals as shown and held in position by a ring 24. With this window structure it is possible to view the progress of the draining of the column of whey and curds contained in the sleeve 1, while during a cleaning phase (via the inlet and outlet 11 and 12 respectively) it is also possible to judge the condition inside each compartment 9.

The inlet and outlet connections 11 and 12 in each compartment 9 lead out tangentially along the wall of the tube 2, this feature being of importance above all for the periodically required cleaning with the aid of sodium hydroxide solution or nitric acid. Cleaning of this kind is necessary in this type of machine because of the ever present threat of bacterial growth in dead corners and chinks in the compartments 9 in the assembly 13.

The detachability of the assembly 13, as described with reference to FIG. 5, is connected to the desire of the user of the machine to change or inspect the sleeve 1 or sleeves 1'. These sleeves are relatively vulnerable because of their, slight thickness (for example 0.8 millimeter), and because a Teflon lining is also frequently provided on the inner wall of the sleeve. Hitherto this sleeve could be removed from said tube 2 only in the upward direction, which made it necessary to have sufficient free space above said tube. This tube length is frequently 2 meters and sometimes even 3 meters, so that a very high ceiling or roof structure is required. With the aid of the present proposal this requirement is now eliminated, and the detachment of the clamp plates 15 and quick-release couplings at the inlet and outlet connections 11, 12 enables the entire assembly 13 to be lifted off the worktable 3 and then worked on in any desired position. When it is required to install a new assembly 13 in the vacant position on the worktable 3, the thickened portion of the flange 14 can be inserted into the opening 16 while at the same time the recess 18 in the flange 14 is positioned on the pin 17. The clamp plates 15 are then placed in position and fastened in the manner illustrated in FIG. 5 by tightening the nuts 19.

I claim:

1. An apparatus for preparing a curd mass by draining whey from a mixture of whey and curds comprising an upright column consisting of at least one whey permeable sleeve of circular or rectangular cross section that has an upper end and a lower end, said sleeve or sleeves being surrounded by a tube having a wall and an outside and an inside, said tube mounted on a worktable with the inside in spaced relation to said sleeve or sleeves to create a free space between the sleeve or sleeves and the tube, a feed means at the upper end of the sleeve means for feeding the mixture of whey and curds into the sleeve or sleeves and a discharge means at the lower end of the sleeve for receiving and discharging a drained and extruded curd mass, dividers mounted in the free space between the sleeve or sleeves and the tube to subdivide the free space into several compartments lying one above the other, each compartment having an inlet and an outlet connection for conveying whey or cleaning liquid, the sleeve means being connected to the tube and to the dividers to form a fixed assembly, and fastening means for fastening the fixed assembly on the worktable.

2. The apparatus of claim 1, wherein said fastening means including a flange on said tube which can be fastened on the worktable, and a plurality of pressure members for releasably fastening the flange to said worktable.

3. The apparatus of claim 2, wherein the flange has a recess and the worktable adjacent said flange is provided with a locating peg which can be fitted into the recess in said flange.

4. The apparatus of claim 1, wherein a window structure is mounted in the tube wall of each compartment, said window structure being detachable from the outside of said tube.

5. The apparatus of claim 1, wherein the inlet and outlet connections of each compartment lead out tangentially along the wall of the tube.

* * * * *